US009056586B2

(12) United States Patent
Huttenlocher (10) Patent No.: US 9,056,586 B2
(45) Date of Patent: Jun. 16, 2015

(54) CARRIER DEVICE (71) Applicant: Decoma (Germany) GmbH, Sulzbach (DE)

(72) Inventor: Marc Huttenlocher, Nuertingen (DE)

(73) Assignee: Decoma (Germany) GmbH, Sulzbach (DE)

( * ) Notice: Subject to any disclaimer, the term of this patent is extended or adjusted under 35 U.S.C. 154(b) by 142 days.

(21) Appl. No.: 13/916,750

(22) Filed: Jun. 13, 2013

(65) Prior Publication Data

US 2013/0334268 A1 Dec. 19, 2013

(30) Foreign Application Priority Data

Jun. 13, 2012 (DE) .......................... 10 2012 011 596

(51) Int. Cl.
*B60R 11/02* (2006.01)
*B60R 11/04* (2006.01)
*G01D 11/30* (2006.01)
*B60R 11/00* (2006.01)

(52) U.S. Cl.
CPC ................ *B60R 11/02* (2013.01); *B60R 11/04* (2013.01); *G01D 11/30* (2013.01); *B60R 2011/0026* (2013.01); *B60R 2011/0071* (2013.01)

(58) Field of Classification Search
USPC ........................... 224/533, 567, 536, 311, 570
See application file for complete search history.

(56) References Cited

U.S. PATENT DOCUMENTS

| | | | | |
|---|---|---|---|---|
| 3,598,297 | A * | 8/1971 | Welch | 224/558 |
| 3,912,055 | A * | 10/1975 | Malooly | 190/109 |
| 4,002,955 | A * | 1/1977 | Eggert et al. | 361/726 |
| 4,228,936 | A * | 10/1980 | Rife | 224/42.23 |
| 4,309,065 | A * | 1/1982 | Pappas | 312/242 |
| 4,334,588 | A * | 6/1982 | Tezuka et al. | 180/68.6 |
| 4,889,377 | A * | 12/1989 | Hughes | 296/3 |
| 4,893,112 | A * | 1/1990 | Hatcher | 340/479 |
| 4,976,450 | A * | 12/1990 | Ellefson | 280/79.11 |
| 4,993,510 | A * | 2/1991 | Kato et al. | 181/141 |
| 5,100,188 | A * | 3/1992 | Stieg | 293/115 |
| 5,161,700 | A * | 11/1992 | Stannis et al. | 211/175 |
| 5,287,971 | A * | 2/1994 | Dorman | 211/12 |
| 5,299,722 | A * | 4/1994 | Cheney | 224/404 |
| 5,328,066 | A * | 7/1994 | Cappuccio et al. | 224/506 |
| 5,395,019 | A * | 3/1995 | Christensen | 224/511 |
| 5,484,092 | A * | 1/1996 | Cheney | 224/404 |
| 5,628,439 | A * | 5/1997 | O'Hara | 224/275 |
| 5,875,948 | A * | 3/1999 | Sadler | 224/404 |
| 5,881,584 | A * | 3/1999 | Brunoski et al. | 70/68 |
| 5,967,392 | A * | 10/1999 | Niemi et al. | 224/404 |
| 5,979,724 | A * | 11/1999 | Loewenthal et al. | 224/483 |
| 6,246,323 | B1 * | 6/2001 | Fischbach | 340/539.13 |
| 6,318,773 | B2 * | 11/2001 | Storer | 293/115 |
| 6,496,138 | B1 * | 12/2002 | Honma | 342/70 |
| 6,966,593 | B2 * | 11/2005 | Plentis et al. | 296/37.6 |
| 7,153,092 | B1 * | 12/2006 | Randolph | 416/55 |

(Continued)

FOREIGN PATENT DOCUMENTS

DE 10333036 A1 2/2005
DE 102006061308 A1 6/2008

(Continued)

*Primary Examiner* — Brian D Nash
(74) *Attorney, Agent, or Firm* — Jordan IP Law, LLC; Todd A. Vaughn (57) ABSTRACT

A carrier device for carrying and fixing a housing for at least one of a sensor system, an electronic system, a drive unit or a camera in or on a motor vehicle.

16 Claims, 7 Drawing Sheets

(56) References Cited

U.S. PATENT DOCUMENTS

| | | | |
|---|---|---|---|
| 8,079,637 B2* | 12/2011 | Barcelo et al. | 296/192 |
| D702,620 S * | 4/2014 | Read et al. | D12/223 |
| 2002/0153181 A1* | 10/2002 | Nakamura | 180/68.1 |
| 2003/0023855 A1* | 1/2003 | Keogh et al. | 713/186 |
| 2003/0142503 A1* | 7/2003 | Ericsson et al. | 362/487 |
| 2005/0006928 A1* | 1/2005 | Diehl et al. | 296/193.1 |
| 2005/0269481 A1* | 12/2005 | David et al. | 250/208.1 |
| 2006/0037519 A1* | 2/2006 | Dunstan | 109/74 |
| 2006/0076820 A1* | 4/2006 | Lackore | 297/452.29 |
| 2006/0144884 A1* | 7/2006 | Abbate | 224/585 |
| 2007/0114256 A1* | 5/2007 | Rodden et al. | 224/328 |
| 2007/0182174 A1* | 8/2007 | Nakayama et al. | 293/115 |
| 2007/0216768 A1* | 9/2007 | Smith et al. | 348/118 |
| 2007/0246495 A1* | 10/2007 | Hague | 224/281 |
| 2009/0110224 A1* | 4/2009 | Tobin et al. | 381/340 |
| 2010/0052353 A1 | 3/2010 | Shea et al. | |
| 2010/0253519 A1* | 10/2010 | Brackmann et al. | 340/572.1 |
| 2010/0264180 A1* | 10/2010 | Allotey | 224/404 |
| 2011/0006553 A1* | 1/2011 | Fretz et al. | 293/115 |
| 2011/0049914 A1* | 3/2011 | Beaird et al. | 293/115 |
| 2011/0146359 A1* | 6/2011 | Elsner et al. | 70/63 |
| 2011/0210153 A1* | 9/2011 | Vicente et al. | 224/519 |
| 2011/0281515 A1* | 11/2011 | Lockwood et al. | 454/75 |
| 2013/0008930 A1* | 1/2013 | Hipshier et al. | 224/275 |
| 2013/0025511 A1* | 1/2013 | Maxwell | 109/59 R |
| 2013/0107046 A1* | 5/2013 | Forgue | 348/148 |
| 2014/0265284 A1* | 9/2014 | Davis et al. | 280/783 |
| 2014/0346299 A1* | 11/2014 | Sterling | 248/228.1 |
| 2015/0029487 A1* | 1/2015 | Nakajima et al. | 356/4.01 |

FOREIGN PATENT DOCUMENTS

| | | |
|---|---|---|
| DE | 102009011614 A1 | 9/2010 |
| EP | 0758834 A2 | 2/1997 |

\* cited by examiner

CARRIER DEVICE

CROSS-REFERENCE TO RELATED APPLICATIONS

The present application claims priority under 35 U.S.C. §119 to German Patent Application No. DE 10 2012 011 596.2 (filed on (Jun. 13, 2012), which is hereby incorporated by reference in its entirety.

TECHNICAL FIELD

A carrier device for electrical components such as, for example, a sensor system, a drive unit and a camera in or on a motor vehicle.

BACKGROUND

In conventional motor vehicles, electronic cameras are used to determine a traffic situation, such cameras being arranged in the front windscreen, and/or the rear windscreen, or in the area of the outer bodywork. These camera systems comprise an optical system and also an image-taking device configured as a chip with an electronic system downstream, so that the image signals may be supplied to an electronic decoding system via corresponding wiring, usually via a coaxial cable.

The camera systems described and used in motor vehicles are compactly designed in a housing, i.e., the optical system, chip and electronic system directly assigned to the chip are combined in a one-piece housing. This compact unit is then inserted into a corresponding carrier in the motor vehicle. A known application is a surround camera, by which the outside environment of the motor vehicle, particularly the rear section, is recorded and reproduced on a screen in the interior.

Surround cameras have hitherto usually been accommodated in a plastic housing. An opening into which the camera housing is inserted and locked in place serves as the carrier at the vehicle end. The carrier or housing exhibit corresponding latching elements, latching lugs and fixing and insertion ribs for fixing the camera. Metal housings of camera systems with more expensive optical systems or larger image chips may not be fixed in these known carrier arrangements or not without additional expense.

DE 102009 011614 A1 describes a locking element comprising two wire brackets. The spring clamp 1 is connected in an articulated manner via a spring carrier 2 to a carrier for an electronic subassembly. The spring carrier 2 is not connected to the carrier frame 6 for the sensor in an articulated fashion. The connection of the spring clamp 1 is made at the housing of the sensor itself, not directly on the carrier. The locking of the solution represented in DE 102009011614 A1 takes place via two spring components and via direct latching to the sensor which is to be held. This means that the flexibility of the carrier is limited, as the components must exhibit a housing which allows latching.

As a further aspect of the housing, in addition to the latching, minimal protection must also be available for the opening for the sensors. If the surround camera is inserted in the front area of the vehicle, it is exposed to stone chips. A covering or shielding is therefore undoubtedly useful.

SUMMARY

The problem addressed by embodiments is that of providing an enhanced carrier device for a sensor system, an electronic system, a drive unit or a camera.

A carrier device is provided in accordance with embodiments includes a carrier configured as a frame surrounding an interior, into which a housing, for example, a housing of a camera, is inserted, a locking element connected to the frame of the carrier in an articulated manner, the locking element being pivotable from a position in which the carrier is released into a position in which the carrier is closed, and also a fixing assigned to the locking element, which holds the locking element in the closed position.

The locking element may be formed as a spring clamp. Such a spring clamp may have a substantially U-shaped or W-shaped cross-section in design and is supported in an opening of the carrier frame via an elbow at the end of each of the U-legs. The spring clamp is thereby pivotable from an open position into a closed position following insertion of the camera housing, in which position the camera housing is held in the carrier frame by spring pressure and pressed against limit stops which are provided. In particular, the spring clamp exhibits a spring section exhibiting spring action in the insertion direction (for the camera housing).

In accordance with embodiments, differently formed locking elements may be provided and, in particular, spring clamps may be connected to the carrier frame. In this way, camera housings of different depths may be positioned in the frame carrier and secured therein.

In accordance with embodiments, the spring clamp, as the locking element, acts on the positioned camera housing via an end plate adapted to the shape of the carrier frame. The end plate causes the pressure on the camera housing from the spring clamp to be evened out. Furthermore, it is possible for an adjustment to be made to a different size of camera housing by way of end plates of different depths. The end plate may, in addition, exhibit sealing elements which act together with the carrier frame, so that the unit housed in the carrier device is protected from atmospheric influences such as debris, dust or moisture.

In accordance with embodiments, a flap is provided to cover the sight opening of the carrier, through which the carrier and the unit contained therein are protected from debris such as, for example, stone chips. Depending on the installation position, the flap in this case is advantageously connected in an articulated fashion to the carrier itself or else to an installation position on the vehicle itself, preferably on the radiator grill.

Embodiments are directed to a carrier device for motor vehicle that includes at least one of the following: a carrier frame defining an interior configured to receive an electrical device; a locking device operatively connected to the carrier frame and pivotable between a first position in which the interior is exposed and a second position in which the interior is at least partially closed; and a fixing device which holds the locking device in the second position.

Embodiments are directed to a carrier device for motor vehicle that includes at least one of the following: a carrier frame defining an interior configured to receive an electrical device; a locking device operatively connected to the carrier frame and pivotable between a unlocked position permitting receipt of the electrical device into the interior and a locked position locking the electrical device in the interior; and a fixing device which holds the locking device in the locked position.

Embodiments are directed to a carrier device for motor vehicle that includes at least one of the following: a carrier frame defining an interior configured to receive an electrical device and having an opening which exposes the interior; an end plate received in the interior of the carrier frame and configured to seal the electrical device in the interior; and a locking device operatively connected to the carrier frame and movable between an unlocked position permitting receipt of the electrical device and the end plate into the interior and a locked position locking the electrical device and the end plate in the interior, wherein the locking device is configured to apply indirect pressure to the electrical device via the end plate.

Embodiments are directed to a carrier device for motor vehicle that includes at least one of the following: a carrier frame defining an interior configured to receive an electrical device and having an opening which exposes the interior; and a flap operatively connected to the carrier frame and movable between a first position away from the opening and a second position over and closing the opening.

DRAWINGS

Embodiments are described by way of example below with reference to the drawings.

DESCRIPTION

Figure 1:
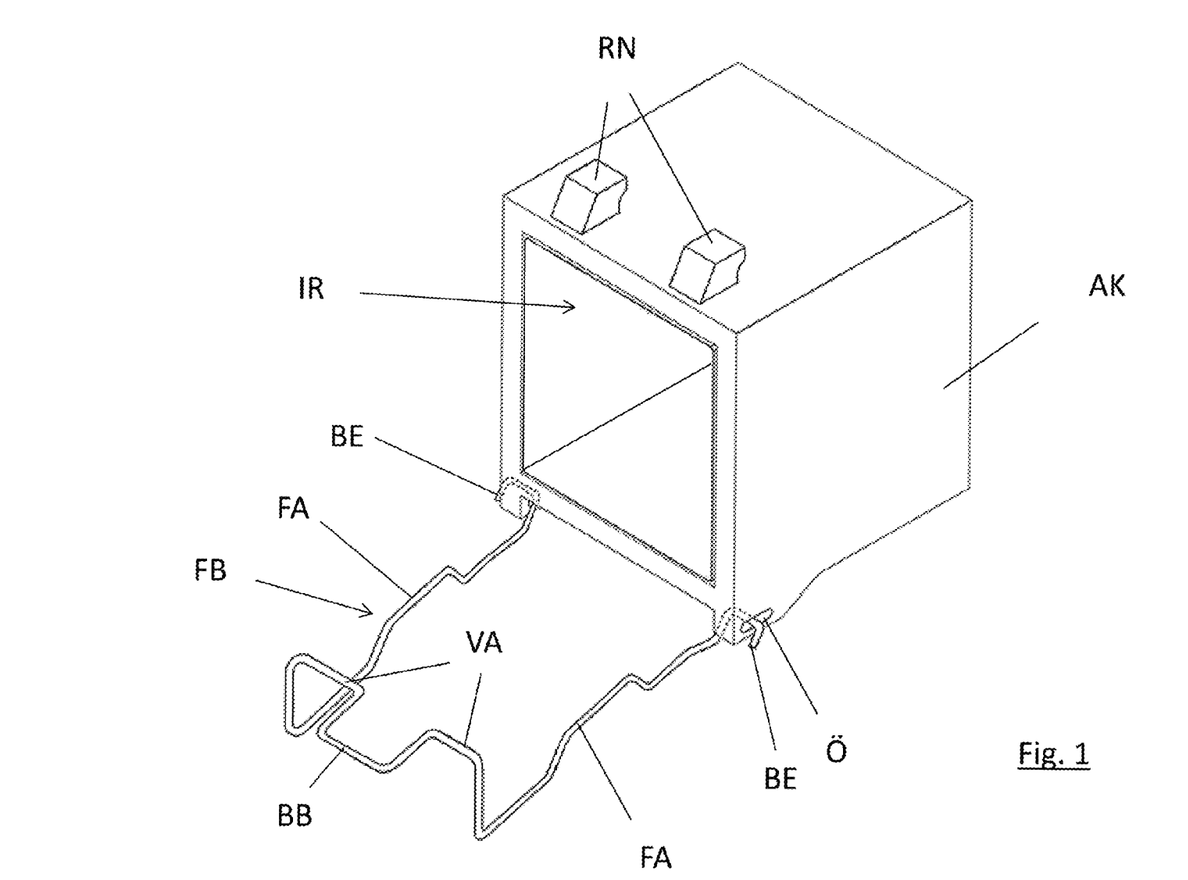
FIG. 1 illustrates a carrier device having a spring clamp in an open position, in an in accordance with embodiments.

FIG. 1 illustrates a carrier body AK, which is substantially box-shaped in design and in the interior IR whereof a camera housing KG (not illustrated) may be inserted. The carrier body AK exhibits two openings Ö opposite one another on the underside, in which the angled ends of a U-shaped spring clamp FB are suspended. The openings Ö are each formed as an elongated hole, so that the ends of the spring clamp FB are easily inserted in one position and securely held in the closed position following the pivoting of the spring clamp FB. The open position of the closing element formed by the spring clamp FB is represented in FIG. 1.

Figure 2:
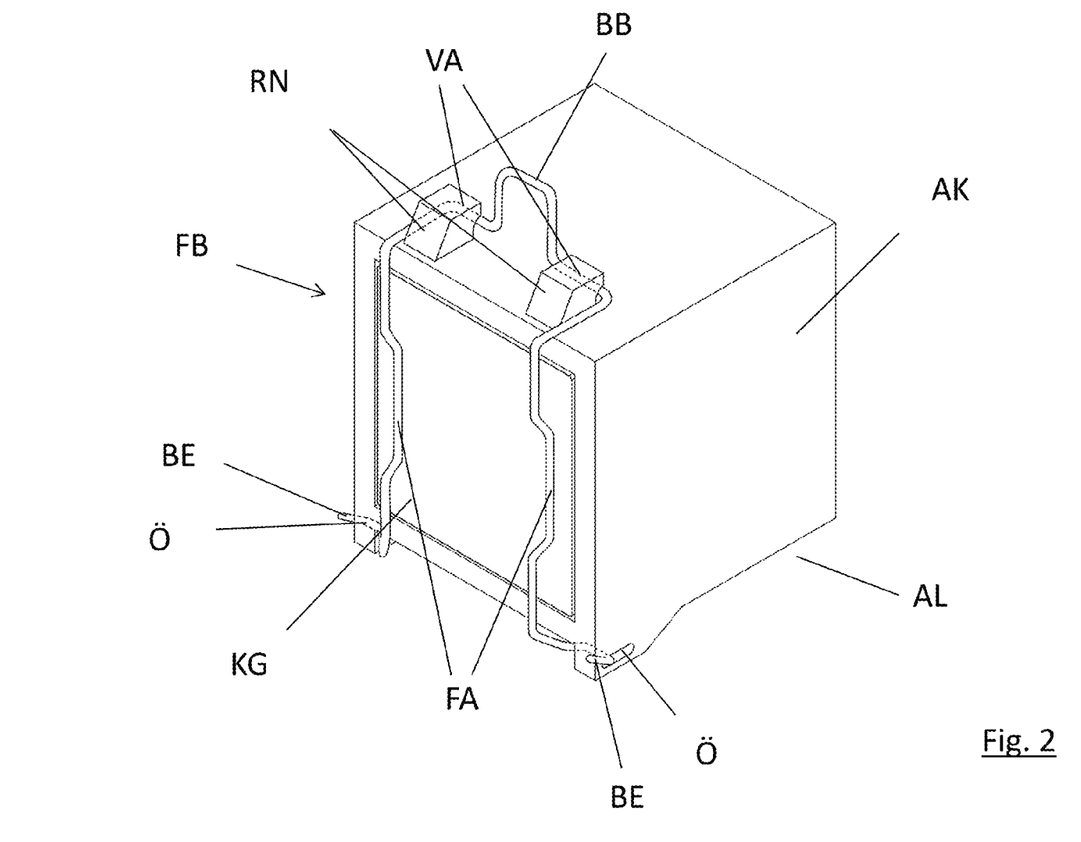
FIG. 2 illustrates a carrier device having a spring clamp in a closed position, in accordance with embodiments.

As illustrated in FIG. 2, following the insertion of a camera housing KG into the carrier body AK, the spring clamp FB is pivoted into the closed position and the locking element is locked. The frame-shaped carrier body AK exhibits two latching lugs RN on the upper side for this purpose, with which two locking sections VA running parallel to the pivot axis of the spring clamp FB act. The forward-pointing sides of these latching lugs RN in the pivoting direction of the spring clamp FB are obliquely configured and thereby make the spring clamp FB easier to close.

Figure 3:
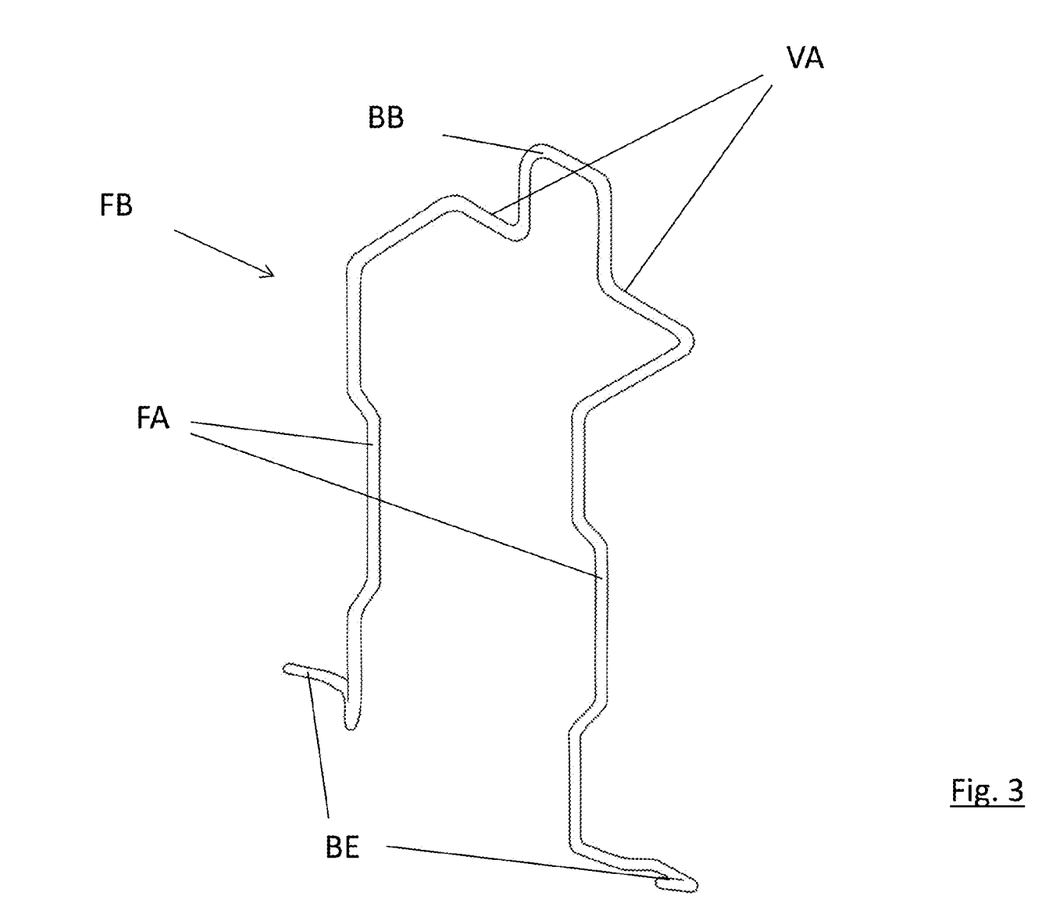
FIG. 3 illustrates the spring clamp of a carrier device, in accordance with embodiments.

As illustrated in FIG. 3, the spring clamp FB may be formed as a U-shaped part which exhibits an angled end BE on both legs. The angled ends each being introduced through one of the openings Ö. Between the locking sections VA working together with the latching lugs RN of the carrier body, the spring clamp FB is formed into an actuating clamp BB, by way of which the closing element may be spring-pivoted over the latching lugs RN. The sections of the legs of the spring clamp FB working together with the rear side of a camera housing KG positioned in the carrier AK are configured as a spring section FA, which exert a force acting on the camera housing KG in the insertion direction in the closed state of the spring clamp.

Figure 4:
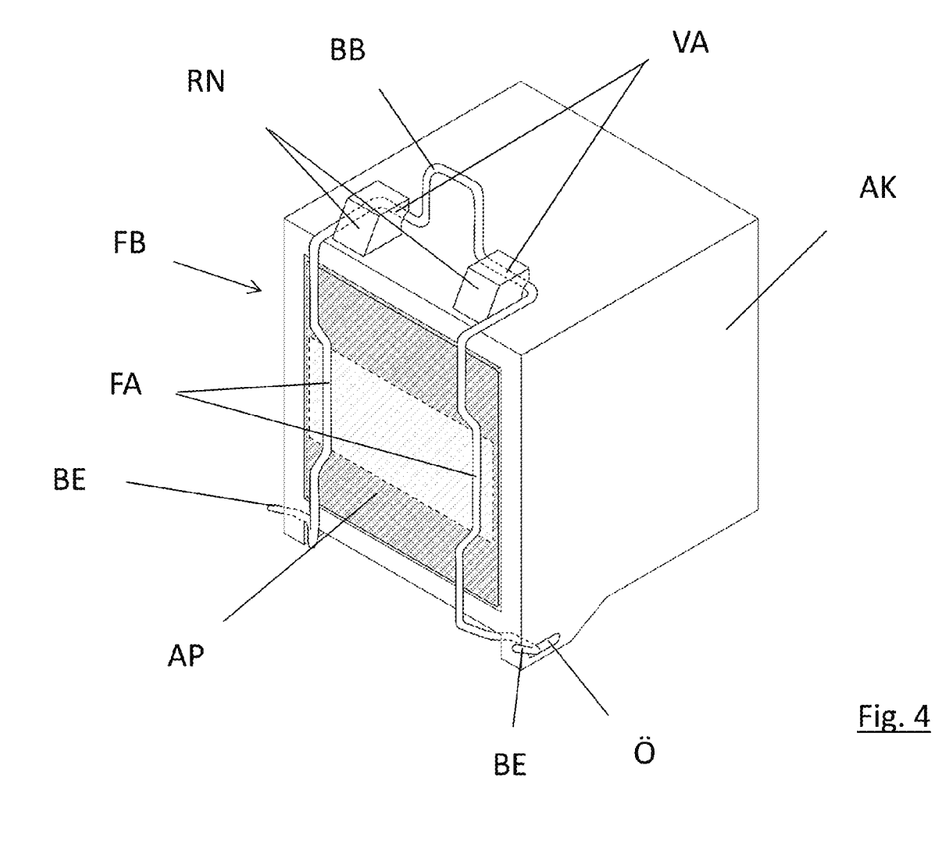
FIG. 4 illustrates a carrier device having an end plate and a spring clamp in a closed position, in accordance with embodiments.

As illustrated in FIG. 4, the spring clamp FB or the spring sections FA thereof, acts on the camera housing positioned in the carrier body AK via an end plate AP.

Figure 5:
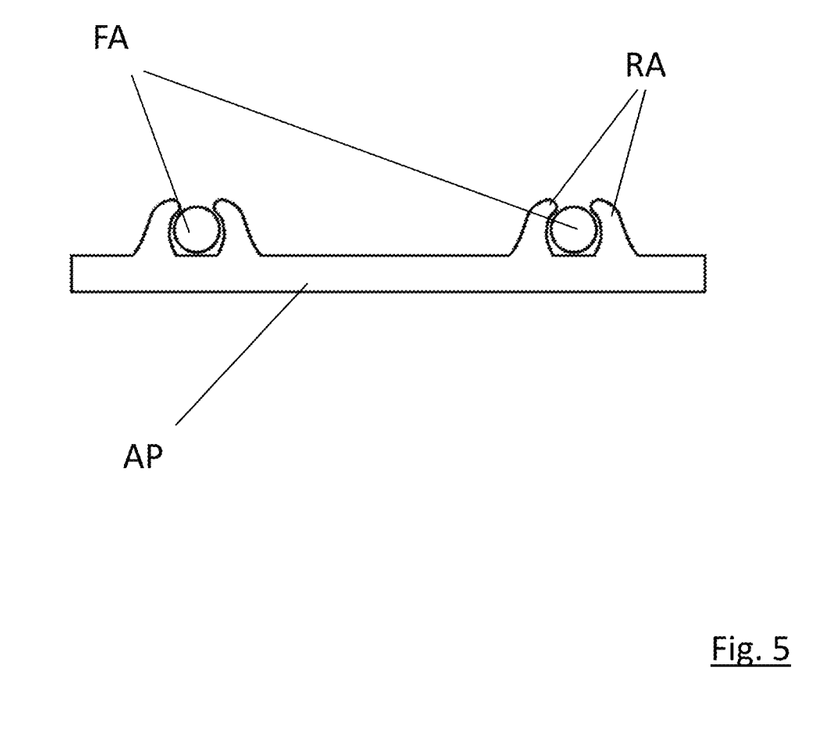
FIG. 5 illustrates a spring clamp operatively connected an end plate, in accordance with embodiments.

As illustrated in FIG. 5, the end plate AP may exhibit latching carriers RA, into which the spring sections FA of the spring clamp are locked. The end plate is thereby directly connected to the spring clamp FB as a locking element, which makes the handling requirement during positioning of a camera housing with subsequent locking of the spring clamp easier and minimizes additional coordination work.

In a further advantageous embodiment, the spring clamp is not separately mounted, but injected during the plastic injection moulding process itself.

The opening 10 in the carrier AK, which in the simplest case comprises a circular hole for a lens (not illustrated in FIGS. 1 to 5). The frame may, however, also exhibit a rectangular opening 10. Depending on the installation site, an opening of this kind is sufficient.

The side which is not visible in the figures and which may be referred to as the viewing direction of the camera or of the sensor may be produced using a moulded-on and correspondingly equipped design surface and hole cut-out, but an extra design side with a hole cut-out may also be combined with the housing AK.

Figure 6:
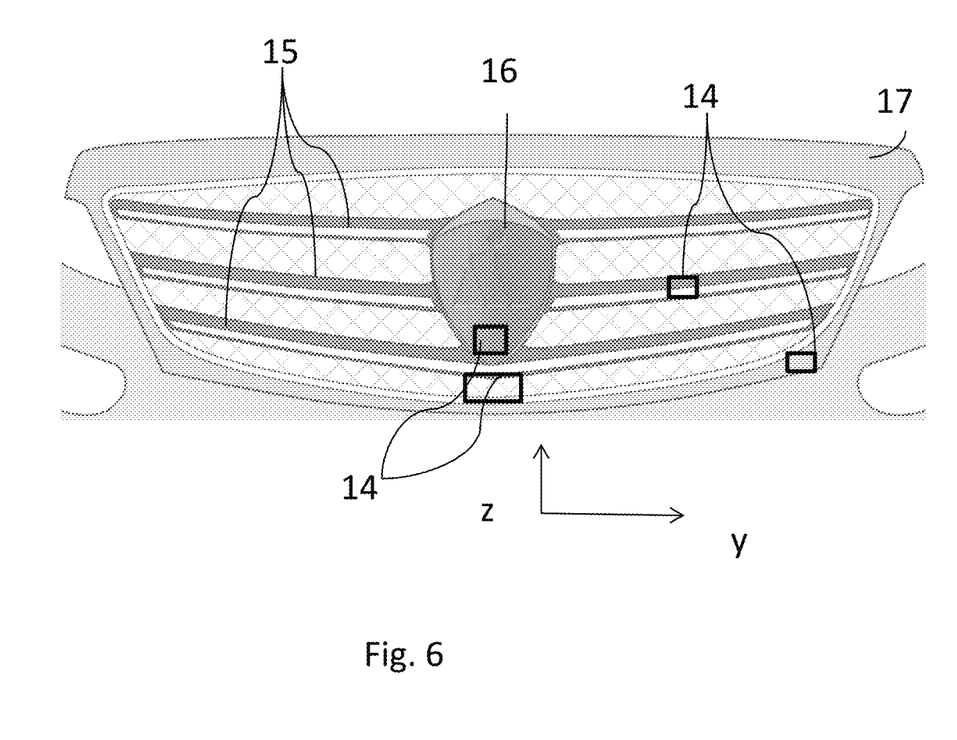
FIG. 6 illustrates a radiator grill into which a carrier device may be provided, in accordance with embodiments.

As illustrated in FIG. 6, a radiator grill 12 is schematically represented which, by way of example, comprises a plurality of installation areas 14. In the simplest case, the installation areas are openings in the structure of the radiator grill, behind which a carrier AK is attached. The installation areas preferably lie in the area of the crossbar 15, the radiator cover 16 or in the frame 17 of the radiator grill or above the manufacturer's insignia or beneath the upper delimiting contour of the bumper or of the bonnet.

Since the sensor system is exposed to debris such as, for example, stone chips, especially when it is installed in the area of the radiator grill, a cover is recommended for the opening 10.

Figure 7A:
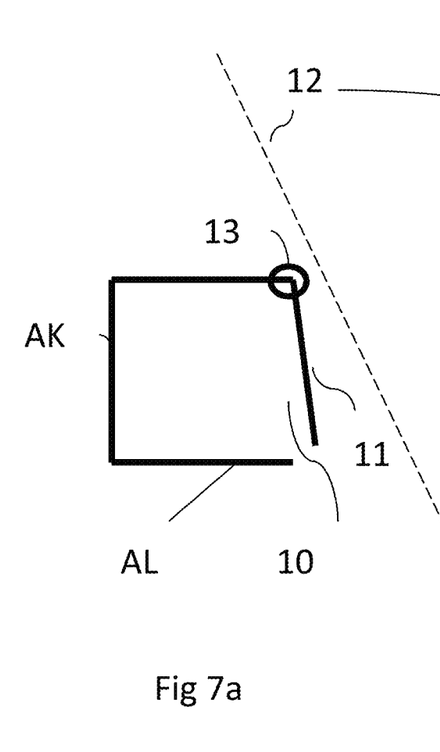
FIGS. 7a to 7c illustrate a carrier device having a flap, in accordance with embodiments.
Figure 7B:
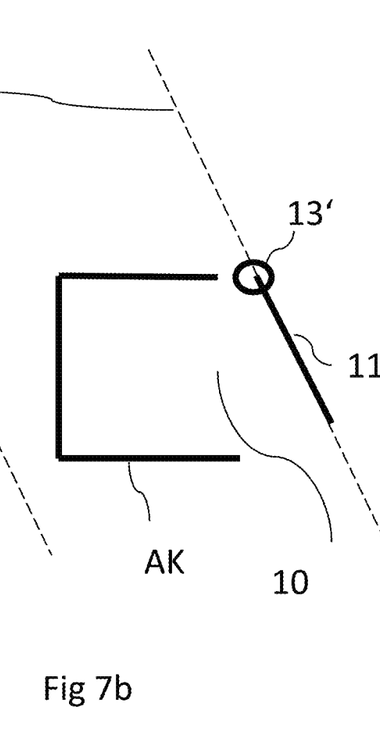

As illustrated in FIGS. 7a and 7b, a solution for a closure of the opening 10 in the carriers is provided which, as is not further explained, comprises the carriers AK in FIGS. 1 to 5. The carrier AK and also the course of the radiator grill 12 may be seen in cross-section. A flap 11 is attached to a pivot point or a pivot axis 13 on the carriers AK and in this example is easily opened in the lower section. The flap 11 may, but need not, close the opening 10 completely, so that spray water is also able to run off too.

In a variant to be completely closed, effective protection against spray water and icing up is achieved through the installation of seals, however the carrier AK should then exhibit a run-off for the spray water which penetrates during running. The housing exhibits a run-off hole AL in the lowest section, so that any accumulated water may escape.

The flap is mechanically or electrically actuatable and is pivotable about the pivot point or pivot axis 13. In the mechanical solution, it is conceivable that the optical system of a camera will push out in the x-direction or also deviating from this obliquely downwards, thereby pressing open the flap. This may happen with the camera optical system itself or using a tappet. To lock the flap, a spring may restore the closed state once again. Alternatively to this, the flap may be carried along by retracting the camera or a tappet.

In an electrical variant, a servomotor must be provided in order to open the flap 11. It may be seen in FIG. 7a that the carrier is disposed behind the radiator grill and the sensor system receives data through the radiator grill itself or through an opening in the radiator grill.

As illustrated in FIG. 7b, the flap 11 is mounted in an articulated fashion at an installation position on the radiator grill and the carrier AK itself is only disposed structurally close but separately behind it.

Figure 7C:
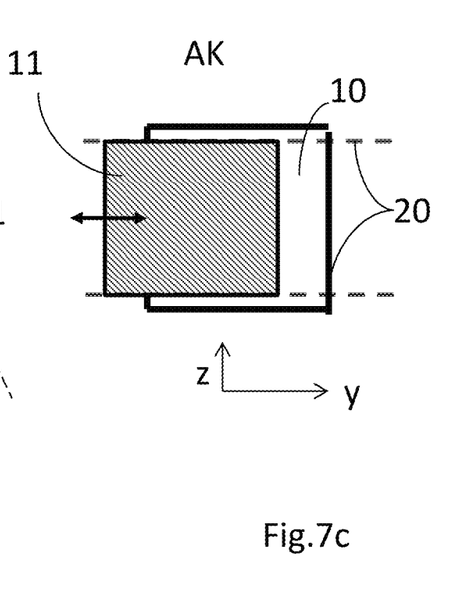

As illustrated in FIG. 7c, in a further alternative embodiment, the flap 11 is conducted in one or two displacement axes 20 and moves along an axis perpendicular to the vehicle longitudinal axis x, in other words laterally in the y-direction or in the z-direction. Alternative installation positions are also conceivable, so that the plane of the movement takes place in any other plane of the X/Y/Z axis system. Alternative axis positions for the displacement axis 20 are also conceivable, however.

The flap 11 is rectangular in the example, although round or rounded or oval forms for the flap 11 are also conceivable. Particularly in the case of a round cover, a turning-away of the flap about a pivot point in the y-z plane of the opening 10 in the carrier AK is easy to implement.

Although embodiments have been described herein, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

LIST OF REFERENCE SIGNS

AK Carrier, camera carrier, carrier frame
IR Interior
FB Spring clamp
Ö Opening (elongated hole)
RN Latching lug
VA Locking section
FA Spring section
BE Angled end
BB Actuating clamp
AP End plate
RA Latching carrier
10 Opening
11 Flap
12 Radiator grill
13 Pivot point or pivot axis
14 Installation areas
15 Crosspiece
16 Radiator cover
17 Frame
20 Displacement axis

What is claimed is:

1. A carrier device for a motor vehicle having a radiator grill, the carrier device comprising:
   a carrier frame received in an installation opening of the radiator grill and which defines an interior to receive an electrical device;
   a locking device including:
      spaced apart locking legs each having ends to pivotally connect the locking device at a pivot axis to the carrier frame between an unlocked position permitting receipt of the electrical device into the interior, and a locked position locking the electrical device in the interior, and spring clamps which are to exert a force, in the locked position of the locking device, against a surface of the electrical device positioned in the interior of the carrier frame the electrical device,
      spaced apart locking sections extending from a respective one of the locking legs to hold the locking device in the locked position,
      an actuating clamp extending between the locking sections to move the locking device between the locking and unlocked positions; and
   a fixing device on the carrier frame, to be engaged by the locking sections of the locking device to maintain the locked position of the locking device.

2. The carrier device of claim 1, wherein the locking sections and the actuating clamp extend between the locking legs.

3. The carrier device of claim 1, wherein the locking sections run parallel to the pivot axis.

4. The carrier device of claim 1, wherein the ends of the locking device are received in corresponding openings of the carrier frame.

5. The carrier device of claim 1, wherein the fixing device comprises pair of spaced apart latching lugs.

6. The carrier device of claim 1, wherein the carrier frame comprises a hole to permit a flow of fluid to exit the interior of the carrier frame.

7. A carrier device for a motor vehicle having a radiator grill, the carrier device comprising:
   a carrier frame received in an installation opening of the radiator grill and which defines an interior to receive an electrical device;
   a locking device including:
      spaced apart locking legs each having ends to pivotally connect the locking device at a pivot axis to the carrier frame between an unlocked position permitting receipt of the electrical device into the interior, and a locked position locking the electrical device in the interior, and spring clamps which are to exert a force, in the locked position of the locking device, against a surface of the electrical device positioned in the interior of the carrier frame the electrical device,
      spaced apart locking sections extending from a respective one of the locking legs to hold the locking device in the locked position,
      an actuating clamp extending between the locking sections to move the locking device between the locking and unlocked positions; and
   an end plate received in the interior of the carrier frame to seal the electrical device therein.

8. The carrier device of claim 7, wherein the end plate is arranged between locking device and the electrical device positioned in the interior of the carrier frame the electrical device.

9. The carrier device of claim 8, wherein the spring clamps are to apply indirect pressure on a surface of the electrical device positioned in the interior of the carrier frame of the via the end plate.

10. The carrier device of claim 7, wherein the end plate comprises spaced apart latching carriers into which the spring clamps are received and locked.

11. The carrier device of claim 7, further comprising a fixing device on the carrier frame, to be engaged by the locking sections of the locking device to maintain the locked position of the locking device.

12. The carrier device of claim 10, wherein the fixing device comprises pair of spaced apart latching lugs.

13. The carrier device of claim 7, wherein the locking sections and the actuating clamp extend between the locking legs.

14. The carrier device of claim 7, wherein the locking sections run parallel to the pivot axis.

15. The carrier device of claim 7, wherein the ends of the locking device are received in corresponding openings of the carrier frame.

16. The carrier device of claim 7, wherein the carrier frame comprises a hole to permit a flow of fluid to exit the interior of the carrier frame.

* * * * *